Jan. 27, 1970 — W. E. WHITE — 3,492,640

EMERGENCY SIGNALING DEVICE

Filed March 17, 1967 — 2 Sheets-Sheet 1

INVENTOR.
WAYNE E. WHITE

BY

ATTORNEYS

United States Patent Office 3,492,640
Patented Jan. 27, 1970

3,492,640
EMERGENCY SIGNALING DEVICE
Wayne E. White, 2735 Glenwood,
Royal Oak, Mich. 48073
Filed Mar. 17, 1967, Ser. No. 624,032
Int. Cl. B60q 1/00, 1/46
U.S. Cl. 340—67                 4 Claims

ABSTRACT OF THE DISCLOSURE

An emergency signalling system for vehicles and other uses, in combination with conventional right-left turn signal systems or separate, and including a flasher providing two separate but operatively coordinated circuits for multiple signalling purposes. A simultaneous flashing emergency signal and an alternating flashing emergency signal are provided and controlled by the turn signal lever switch.

BACKGROUND OF THE INVENTION

Most electrical turn signal systems for vehicles include connections to front parking lights and rear brake lights made by a switching device on the steering column and caused to blink on and off by a thermal responsive flasher in the circuit. Although it has been suggested that the different lights be connected together, to flash in unison for emergency signalling purposes, this is difficult to do in existing systems without interfering with the turn signal and brake light circuits and usually requires a separate switch and flasher circuit. Consequently, the only emergency signalling systems which have been accepted are those with a separate thermal responsive flasher and a separate control switch in the driver's compartment or otherwise separate from the turn indicator control and flasher and which are used mostly for off-highway purposes.

For maximum highway safety, drivers need an emergency signalling system with the controls at their fingertips and so that their attention is not diverted from a dangerous situation for even a moment. Moreover, they need an emergency warning signal for both on-coming and following traffic such as is obtained by many in moving the turn signal control alternately between right and left signalling positions or by pumping the brake pedal.

SUMMARY OF THE INVENTION

The present invention is directed to a signalling system for providing both a simultaneous flashing emergency signal and an alternating emergency warning signal that may be incorporated within present vehicle turn signal systems.

The turn signal switching device is modified to include two additional switching positions, transversely disposed across the normal path of movement for turn signalling purposes, so that all of the signal lights will be connected to a live circuit in one position and the right and left signal lights are alternately energized in the other position.

Only one flasher is used in the system and it is provided with two separate circuits which are operatively coordinated. It includes a thermal responsive member that carries two different circuit making contacts and the wiring within the flasher and to the switching device on the steering column is such that one circuit is used to turn signal purposes, the other for simultaneous emergency flashing, and both are alternately used for the emergency warning signal.

A particularly new and novel flasher is disclosed as a part of this invention wherein a current conducting thermal responsive member is provided with a non-conductive extension to carry a secondary circuit making contact that by-passes the conductive part thereof.

All of the switching required for both turn signal and emergency signalling operation, as well as for disconnecting the brake lights, when used as signal lights, may be provided within the conventional type of finger-tip control switch provided on the steering column of most vehicles.

DETAILED DESCRIPTION

Figure 1:
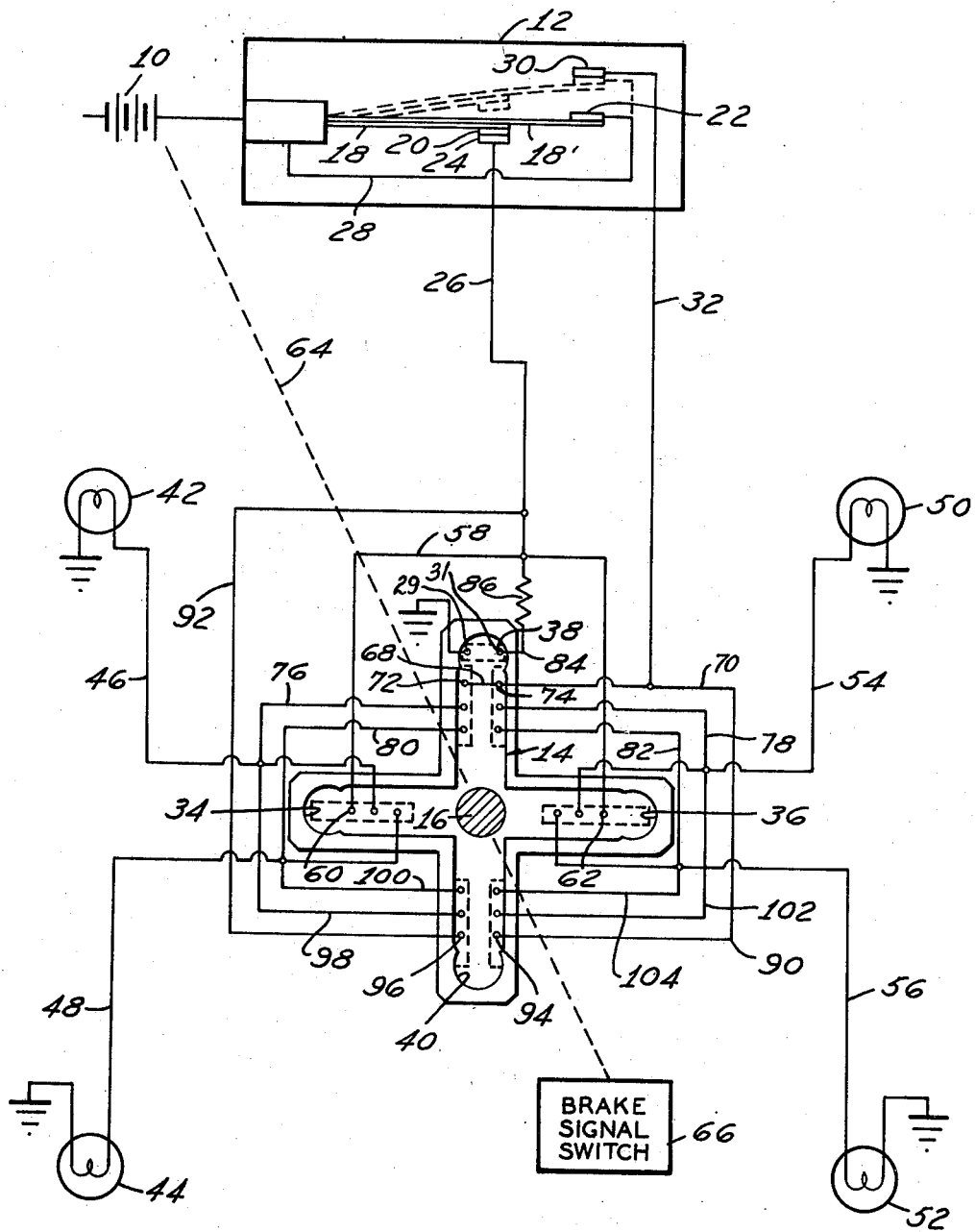
FIGURE 1 is a schematic wiring diagram of a combined turn signal and emergency signalling system.

A source of electrical power, such as the battery 10, is connected to a flasher 12 which is in turn connected to a switching device of the type mounted on a vehicle steering column. In the present instance the switch control is identified by the schematic outline 14 showing lateral and transverse directions of travel which are to be permitted the control lever 16, shown centrally thereof.

The flasher 12 includes a thermal responsive current conducting arm 18 having a contact 20 provided thereon and an extension 18′ which does not conduct current, and therefore serves as an insulator, with a contact 22 provided on its extended end. The contact 20 is disposed for circuit making and breaking engagement with a contact 24 connected by conductor 26 to the swtiching device on the steering column. The contact 22 is connected by a jumper 28 to receive current flow from the battery without having it pass through the conductive part of the arm 18 and is disposed for circuit making and breaking engagement with a contact 30 connected by conductor 32 to the switching device on the steering column.

The switching device on the steering column is of the type used for electrical turn signal indicator systems except that the control lever, identified as 16, is pivotally mounted for movement in transverse directions from a neutral position within guide slots 34 and 36, in one plane of movement, and guide slots 38 and 40, in a plane of movement normal thereto. The same holding means at the end positions in the guide slots, and cancelling provisions as regards the control lever in the turn signal guide slots 34 and 36, may be incorporated and are to be assumed as present although not specifically shown.

Left front and rear signal lights 42 and 44 and driver's compartment signal light are connected by electrical conductors 46 and 48 to the part of the switching device which includes the left turn signal guide slots 34 and right front and rear signal lights 50 and 52 and driver's compartment signal light are connected by conductors 54 and 56 to the part of the switching device which includes the right turn signal guide slot 36.

In the normal turn signal indicating system, as in this instance, the conductor 26 from the flasher is connected to a conductor 58 which provides circuit making contacts 60 or 62 in each of the right and left turn indicator guide slots. When the control lever 16 is moved to the right or left, it causes the contacts for the right or left turn signal lights to be made and for current to flow through the flasher contacts 20 and 24, when made, and for the circuit to be interrupted when the arm 18 of the flasher causes the contacts 20 and 24 to break. The control member 16 need not, and does not in the present instance, form part of the circuit but merely causes the contacts to be made when it is moved towards the end of one of the guide slots; as by contact making members shown in dotted outline in the ends of each of the guide slots.

Figure 2:
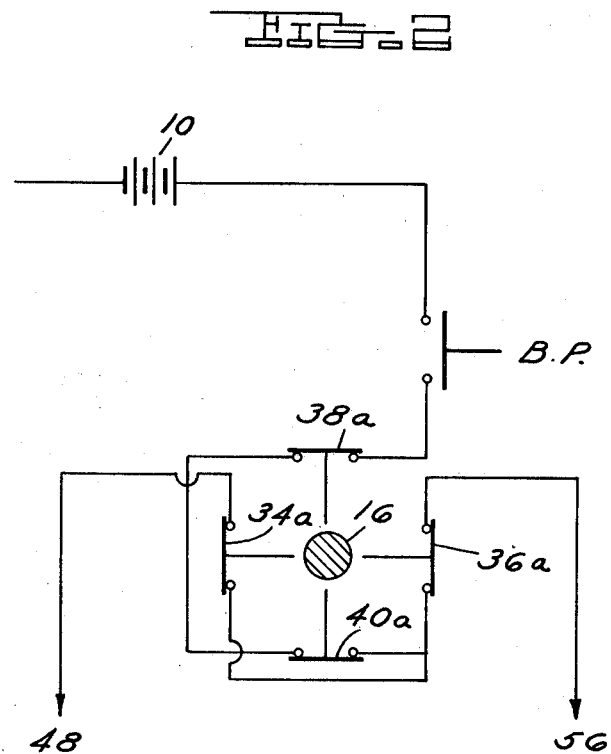
FIGURE 2 is a typical brake signal switch and circuit modified for use with the present invention.

As in conventional turn signal systems, when the brake lights are used as the rear signal lights, a connection is provided through the neutral position of the control lever 6, between the power source and a brake light control or signal switch as shown by the modified circuit in FIGURE 2. This connection is shown by the broken line 64 through the control lever to the signal switch 66 in FIGURE 1 and signifies that when the control lever is in other than its neutral position the brake lights, as such, will not be energized and can therefore function independently as signal lights. In turn signal operation only the energized side is taken out of the stop circuit by either 34a or 36a. In emergency signal operation both sides are taken out by either 38a or 40a.

In providing for an emergency signalling system, in combination with the turn signal indicator system described, circuit making contacts are provided in the guide slot 38 of the switching device to cause simultaneous flashing of all four of the different signal lights, that is, both right and left sets, in unison, and other circuit making contacts are provided in the guide slot 40 to cause alternate flashing of the different sets of right and left signal lights.

For the simultaneous flashing emergency signal, the electrical connection 32 to the flasher contact 30 is connected to conductor 70 which includes separate circuit making contacts 72 and 74 in the guide slot 38. In addition, conductor connections 76 and 78 from the front signal light connections 46 and 54, as well as those designated 80 and 82 from the rear signal light connections 48 and 56, provide contacts in the guide slot so that both right and left sets of signal lights are engaged to the contacts 72 and 74 and all are energized at the same time when the control lever 16 is moved into the designated guide slot.

The contacts 72 and 74 in guide slot 38 receive current flow through the flasher 12 when contacts 22 and 30 are made. However, the termal responsive arm 18 must pass current and break to its secondary circuit closing position before the current flow in the jumper line 28, to contact 22, is effective. To accomplish this, a shunt connection 84 is made to conductor 26 and includes a resistor 86 and grounding contacts 29 and 31 in the guide slot 38 which are closed by the control arm member 16. This assures current flow through the thermal arm 18 of the flasher sufficient for it to heat up and break to the secondary circuit position.

For alternate flashing to provide an emergency warning signal, a connection 90 is made through the conductor 70 to the current passing conductor 32 of the flasher and a connection 92 is made to the other flasher connection 26 to provide circuit making contacts 94 and 96 in the guide slot 40. A conductor 98 is provided between the guide slot and the left front signal light connection 46, and a conductor 100 is provided to the left rear signal light connection 48 to energize the left signal lights when the flasher contact 24 is made. Similarly, conductors 102 and 104 are provided for the right signal lights to cause them to be energized when current flows through the flasher contacts 22 and 30. As a consequence, when the operating lever 16 is moved into the guide slot 40 the left set of signal lights are lit when one set of flasher contacts are made, and they are out and the right hand set of signal lights are lit when the other set of flasher contacts are made.

It will be appreciated that the circuit making electrical connections have been shown in a manner to best illustrate the invention and that the circuit may be simplified and all connections may be made essentially at and within the switching device. Also, the guide slots for the emergency signalling contacts may be in reversed positions, or made to lie parallel but separate from the turn signal slots, etc. However, the arrangement shown is considered one of the best to be used.

One may use the alternate flashing signal system for signalling danger to on-coming and following cars while in traffic and the simultaneous flashing for off-highway emergency signalling. In this way, all concerned may be alerted to situations which so frequently cause accidents, injury and deaths on public thoroughfares.

Although separate signalling systems not utilizing brake lights for emergency and turn indication may be provided, or separate manual operating controls not utilizing the turn signal lever to energize one or both of the emergency signal circuits might be employed with a common flasher and switch housing, still using the innovations taught by this invention, the greatest advantage is in a combined signalling system as has been described. Aside from the sayings in the cost of materials and installations, the driver of a vehicle is provided with a signalling device right at his fingertips and which need not distract his attention from any emergency situation when it arises.

I claim:

1. In a turn signal system for vehicles having individual left and right turn signal circuits, a flasher circuit interrupting means, and a manually operable control switch having left, right and neutral positions adapted respectively to interpose said flasher means in the left, right or neither turn signal circuit, an emergency signal in combination therewith comprising an additional alternate position for said control switch and switch connections operative thereby to interpose said flasher means in both of said turn signal circuits, the improvement comprising a second additional alternate emergency position and corresponding switch connections for said control switch, said flasher circuit interrupting means operating in one emergency position to alternately interrupt said respective turn signal circuits and in the other emergency position to simultaneously interrupt said circuits.

2. The system of claim 1 wherein said flasher circuit interrupting means includes a dual circuit breaking and making thermal responsive snap action element operative in a first position to make one circuit while breaking another and in a second position to oppositely break said one circuit while making the other, said element being heated to produce snap action by said one circuit, the connection established by the emergency simultaneous position of the control switch separating the heating circuit of said flasher means from both turn signal circuits, and the connections established by the emergency alternating position of said control switch interposing the heating circuit of said flasher means in one turn signal circuit and the other circuit of said flasher means in the other signal circuit.

3. The system of claim 1 wherein left and right turn signal lights having individual circuits are employed also as brake lights simultaneously energized in response to brake application, said control switch connections interposing said flasher circuit energizing means in one, or the other, or neither, or both of said brake light circuits in response to the respective left, right, neutral or emergency positions of said control switch.

4. The system of claim 2 wherein left and right turn signal lights having individual circuits are employed also as brake lights simultaneously energized in response to brake application, said control switch connections interposing said flasher circuit energizing means in one, or the other, or neither, or both of said brake light circuits in response to the respective left, right, neutral or emergency positions of said control switch.

References Cited

UNITED STATES PATENTS

| | | |
|---|---|---|
| 1,674,027 | 6/1928 | Van Deventer. |
| 2,090,332 | 8/1937 | O'Neil. |
| 2,667,602 | 1/1954 | Flemming. |

UNITED STATES PATENTS

| | | | |
|---|---|---|---|
| 2,768,366 | 10/1956 | Bertaud | 340—74 |
| 2,771,525 | 11/1956 | Sivak. | |
| 2,942,236 | 6/1960 | Hollins | 340—81 |
| 3,096,505 | 7/1963 | Richins | 340—71 X |
| 3,300,756 | 1/1967 | Miller | 340—81 X |
| 3,302,173 | 1/1967 | Konz et al. | 340—81 |

JOHN W. CALDWELL, Primary Examiner

K. N. LEIMER, Assistant Examiner

U.S. Cl. X.R.

340—83